United States Patent [19]

Waugh

[11] E Patent Number: Re. 33,175

[45] Reissued Date of Patent: Mar. 6, 1990

[54] METHOD FOR MAKING DECORATIVE EMBLEMS

[75] Inventor: Robert E. Waugh, Sun City, Fla.

[73] Assignee: The D. L. Auld Company, Columbus, Ohio

[21] Appl. No.: 582,317

[22] Filed: Feb. 22, 1984

Related U.S. Patent Documents

Reissue of:

[64] Patent No.: 4,100,010
Issued: Jul. 11, 1978
Appl. No.: 702,194
Filed: Jul. 2, 1976

U.S. Applications:

[63] Continuation-in-part of Ser. No. 478,789, Jun. 12, 1974, abandoned.

[51] Int. Cl.[4] ..... B29C 31/08; B29C 39/12

[52] U.S. Cl. ..... 156/242; 156/308.2; 264/1.7; 264/132; 264/259; 264/299; 264/313

[58] Field of Search ..... 264/132, 289, 299, 265, 264/134, 135, 267, 268, 259, 7.7, 313; 156/245, 247, 344, 233, 232, 246, 242, 309; 29/527.4; 425/110

[56] References Cited

U.S. PATENT DOCUMENTS

| | | | |
|---|---|---|---|
| 1,521,563 | 12/1924 | Pfleegor | 350/418 |
| 1,693,561 | 11/1928 | Klein | 427/282 |
| 1,744,884 | 1/1930 | Greiner | 264/13 |
| 1,973,403 | 9/1934 | Borden | 156/246 |
| 2,073,844 | 3/1937 | Lowenfels | 428/31 |
| 2,244,565 | 6/1941 | Nast | 428/162 |
| 2,300,495 | 11/1942 | Gerhart | 35/20 |
| 2,350,421 | 6/1944 | Schroder et al. | 264/255 |
| 2,351,933 | 6/1944 | Decker et al. | 156/240 |
| 2,353,995 | 7/1944 | Conner | 428/357 |
| 2,379,218 | 6/1945 | Dial | 264/313 |
| 2,451,913 | 10/1948 | Brice | 428/67 |
| 2,500,728 | 3/1950 | Williams | 264/22 |
| 2,611,168 | 9/1952 | Light | 24/150 |
| 2,704,211 | 3/1955 | Decepoli | 273/128 |
| 2,745,135 | 5/1956 | Gora | 264/153 |
| 2,770,550 | 11/1956 | Hall et al. | 312/209 |
| 2,835,926 | 5/1958 | Maier et al. | 264/268 |
| 2,928,149 | 3/1960 | Zifferer | 22/87 |
| 2,931,119 | 4/1960 | Gits et al. | 428/64 |
| 3,042,264 | 7/1962 | Trumbull et al. | 222/142 |
| 3,042,268 | 7/1962 | Pyles | 222/327 |
| 3,043,477 | 7/1962 | Trumbull et al. | 222/1 |
| 3,064,717 | 11/1962 | Morrealle et al. | 156/575 |
| 3,066,248 | 11/1962 | Miller | 317/234 |
| 3,075,249 | 1/1963 | Sucher | 264/255 |
| 3,114,597 | 12/1963 | Lee | 264/1.9 |
| 3,178,621 | 4/1965 | Glickman | 317/234 |
| 3,179,714 | 4/1965 | Brockman et al. | 525/535 |
| 3,194,777 | 7/1965 | Christenson et al. | 524/294 |
| 3,224,642 | 12/1965 | DeMartelaere et al. | 222/134 |
| 3,246,066 | 4/1966 | Gits | 264/132 |
| 3,252,022 | 7/1966 | Caracciolo | 317/101 |
| 3,256,626 | 6/1966 | Stoffel | 40/1.5 |
| 3,257,747 | 6/1966 | Schimmel | 40/1.5 |
| 3,283,224 | 11/1966 | Erkan | 317/234 |
| 3,337,476 | 8/1967 | Vandenberg | 528/421 |
| 3,381,947 | 5/1968 | Beggs | 266/4 |
| 3,385,748 | 5/1968 | Neale et al. | 428/40 |
| 3,391,101 | 7/1968 | Kelly et al. | 524/289 |
| 3,393,243 | 7/1968 | Cuscurida | 528/620 |
| 3,420,761 | 1/1969 | Feibush | 204/159.12 |
| 3,476,933 | 11/1969 | Mendelsohn | 521/61 |
| 3,566,208 | 2/1971 | Wang | 317/234 |
| 3,606,269 | 9/1971 | Trumbull | 366/303 |
| 3,619,259 | 11/1971 | Wright et al. | 361/323 |
| 3,654,062 | 4/1972 | Loew | 428/164 |
| 3,679,461 | 7/1972 | Maylotte | 427/54.1 |
| 3,725,112 | 4/1973 | Hansen | 428/13 |
| 3,741,116 | 6/1973 | Green et al. | 101/382 MV |
| 3,755,262 | 8/1973 | Slagel | 528/66 |
| 3,762,939 | 10/1973 | Hunter | 428/215 |
| 3,844,461 | 10/1974 | Robinson et al. | 101/382 MV |
| 3,887,734 | 6/1975 | Chazan | 428/40 |
| 3,891,327 | 6/1975 | Welch | 356/244 |
| 3,919,173 | 11/1975 | Coyner et al. | 528/55 |
| 3,959,102 | 5/1976 | Wajs et al. | 204/159.13 |
| 3,992,236 | 11/1976 | Wanesky | 156/344 |
| 4,068,028 | 1/1978 | Samonides | 156/289 |
| 4,100,681 | 7/1978 | Hollander | 33/389 |

FOREIGN PATENT DOCUMENTS

| | | |
|---|---|---|
| 2731081 | 12/1982 | Fed. Rep. of Germany . |
| 0143377 | 7/1972 | Iran . |
| 36-16471 | 6/1961 | Japan . |
| 294327 | 7/1963 | Japan . |

| | | |
|---|---|---|
| 45-28392 | 10/1970 | Japan . |
| 46-15316 | 4/1971 | Japan . |
| 48-32158 | 10/1973 | Japan . |
| 0499374 | 1/1974 | Japan . |
| 49-17589 | 2/1974 | Japan . |
| 50-55436 | 5/1975 | Japan . |
| 50-71463 | 6/1975 | Japan . |
| 0630364 | 10/1949 | United Kingdom . |
| 864662 | 4/1961 | United Kingdom . |
| 1587833 | 4/1981 | United Kingdom . |
| 1587834 | 4/1981 | United Kingdom . |

OTHER PUBLICATIONS

Coghill/Anderson, "Why Water Over-Fills a Tumbler and Floats Glass Plates and Flaky Minerals", Jul. 1918, *Scientific American.*

Stoeckhert, "Kunststoff-Lexikon", 1975, pp. 182, 183.

Saunders et al., "Polyurethanes—Chemistry and Technology", 1964, pp. 534, 535.

Coghill/Anderson, "Certain Interfacial Tension Equilibria Important in Flotation", Sep. 1923, Gov't Printing Office.

Partington, "An Advanced Treatise on Physical Chemistry", 1952, pp. 163, 164.

Deposition of William Keith Bolland, "In the Matter of Certain Plastic-Capped Decorative Emblems", Investigation No. 337-TA-121.

Leicht, "Report on Trip to Buick", Nov. 1966.

The D. L. Auld Company v. Chroma Graphics Corp., 714 F.2d 1144, (Fed. Cir. 1983), and record of proceedings.

Glasstone, Textbook of Physical Chemistry, 2d ed., D. Van Nostrand, New York.

DuPont Magazine, Aug. 1972, pp. 29-31, "Emblems of an Automative Era".

Vapic Laboratories, Diamoon #2000, Epoxy System.

*Primary Examiner*—Willard E. Hoag

*Attorney, Agent, or Firm*—Porter, Wright, Morris & Arthur

[57] ABSTRACT

A method of casting decorative emblems from a polyurethane-type compound. A series of decorvative discs are held flat and horizontal while the polyurethane composition is cast thereon to form a meniscus. The polyurethane composition comprises a polyether polyol component and a diisocyanate component. The cast polyurethane, when cured, gives a lens effect to the decorative discs.

14 Claims, 2 Drawing Sheets

METHOD FOR MAKING DECORATIVE EMBLEMS

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of application Ser. No. 478,789, filed June 12, 1974 now abandoned.

BACKGROUND OF THE INVENTION

This invention relates to a method for making a material used as a substitute for vitreous enamel. The invention also relates to making emblems from this material.

Decorative plaques and emblems are widely used throughout a number of industries. In the past a colored vitreous frit was flowed into a bronze substrate and fired at 1250° F. The glass-like vitreous enamel served to beautify the product and protect the decorative emblem from weathering should the plaque or emblem be exposed to the environment. Today plastics are primarily used for producing such plaques and emblems.

For example, in Loew (U.S. Pat. No. 3,654,062) there is disclosed a process of injection molding a decorative Mylar facing sheet over a vinyl plastic body. The plaque is coated with a layer of protective varnish on the outer surface of the facing sheet. Other molding processes, such as compression molding (either one or two shot), are also well known in the art. See for instance, U.S. Pat. Nos. 2,244,565; 2,931,119; 3,075,249; and 3,114,597.

Likewise, polyurethane molding compositions are also well known in the art. Thus, U.S. Pat. Nos. 3,337,476; 3,391,101; and 3,393,243 disclose polyurethane compositions. Pat. No. 3,391,101, then, states that the compounds disclosed therein may be "poured into the mold as a liquid" (Col. 1, lines 49–50); although, this is actually in the context of dealing a pipe rather than producing a molded product. None of these patents disclose casting a polyurethane upon a substrate to produce a decorative emblem.

SUMMARY OF THE INVENTION

A polyurethane-type compound is produced by the reaction of polypropylene glycols with an aliphatic diisocyanate. To facilitate the application of the chemicals in the product, the glycols and diisocyanate are compounded into an easily handled two-part product. The two parts are then mixed in proper proportion, degassed to remove air bubbles and then poured onto an emblem or other surface to form a clear, hard plastic material.

Accordingly, it is an object of this invention to provide a method of casting emblems on discs utilizing a clear, hard plastic material suitable for a substitute for vitreous enamel.

Other objects and advantages of the invention will be apparent from the following description, the accompanying drawings and the appended claims.

DESCRIPTION OF THE PREFERRED EMBODIMENT

Figure 1:
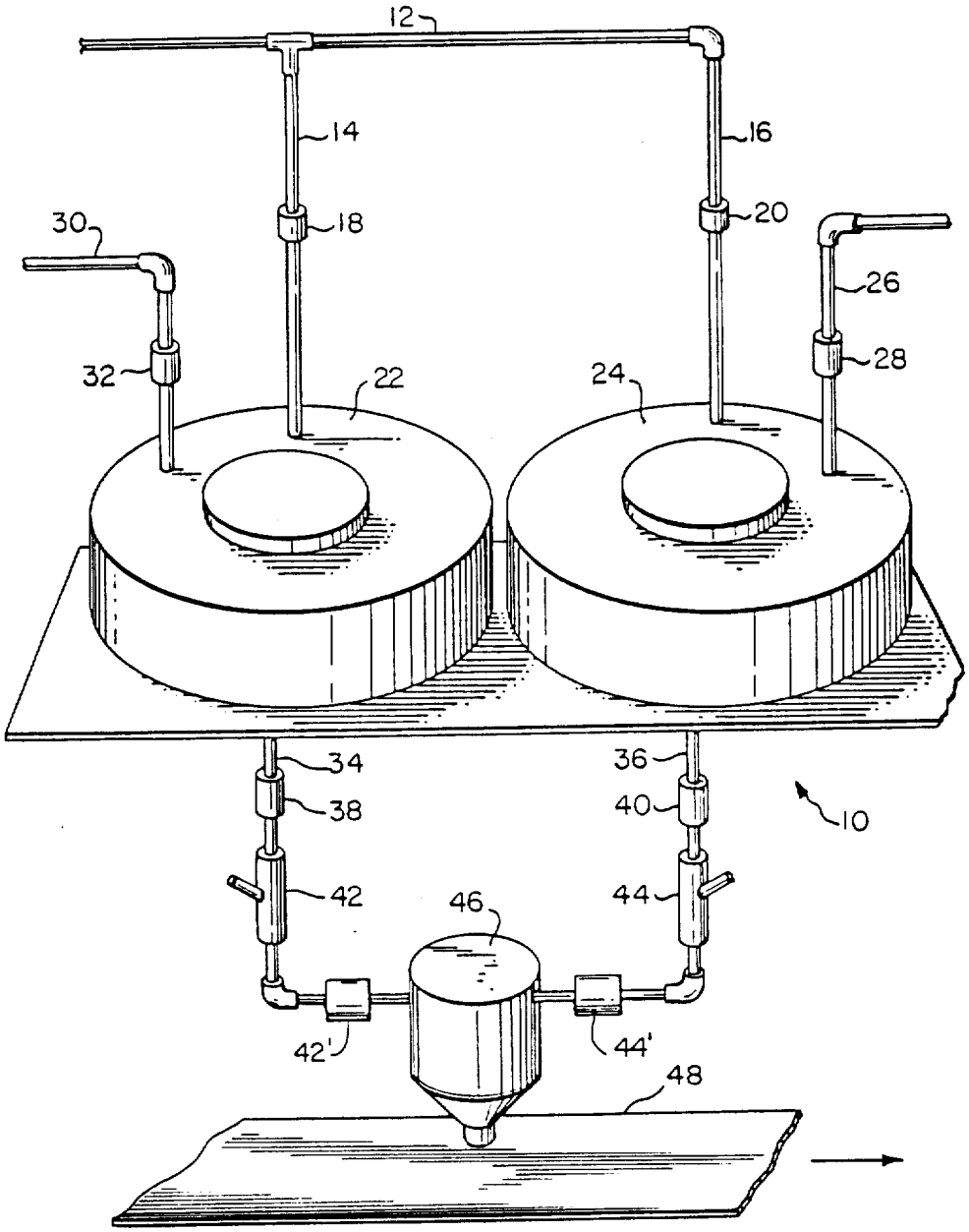
FIG. 1 is a perspective view showing the mixing tanks and dispensing nozzle.

One of the bases for this invention is the formation of a clear, hard plastic material for use as a substitute for vitreous enamel. It involves basically a reaction between an isocyanate material and a polyol to form a urethane polymer. This is a fairly simple addition process which, when extended to difunctional or polyfunctional reagents, provides a direct route to polymers. The hydrogen on the nitrogen atom of the urethane group is capable of reacting with more isocyanate to form allophanates which provide the means of introducing branching or cross-linking in the polyurethanes. The reaction provides a bond high in thermal stability and resistant to hydrolysis.

In the instant process, a polyurethane compound is produced by the reaction of polypropylene glycols with an aliphatic diisocyanate. To facilitate the application of the chemicals in production, the glycols and diisocyanate are compounded into an easily handled two-part product.

The first part, Part A, which is the polyol part of the two-part system, is made by mixing a difunctional, trifunctional and/or tetrafunctional polypropylene glycol, adding suitable catalyst, surface active agents and light and heat stabilizing agents.

The polyol portion, Part A, is prepared from polypropylene glycols which have two, three, four or more hydroxyl groups per molecule or any combination of these. The polyols are combined with a catalyst, ultraviolet absorber, antioxidant and surface active agent. After combination, the product is heated to 90° C. under twenty-nine inches of vacuum for one hour, cooled to room temperature and packaged. A typical formula is as follows:

| Part A | |
|---|---|
| Polypropylene glycol (triol) TP-440 | 77.57 |
| Polypropylene glycol (diol) P-245 | 19.39 |
| Catalyst (DBTDL) | 1.00 |
| Antioxidant (Naugard P) | 1.00 |
| Ultra-violet absorber (UV-317) | 1.00 |
| Surface active agent SF-69 | .04 |
| | 100.00 |

The value of the catalyst (DBTDL) can range from 0.10 to 2.00; the value of the antioxidant can vary from 0.25 to 2.00; the value of the ultra-violet absorber (UV-317) can vary from 0.25 to 2.00 and the value of the surface active agent SF-69) can vary from 0.01 to 0.10.

The molecular weight of the triol can vary from 300 to 3000 and the molecular weight of the diol can vary from 400 to 2000.

The other part, Part B, of the composition is prepared by reacting an aliphatic diisocyanate with a polyol, di, tri or tetrafunctional in nature to form a quasi prepolymer. The purpose of the prepolymer is to control the viscosity and ultimate reaction rate of Part A with the diisocyanate Part B. The dry polyol, di, tri, and tetrafunctional is mixed with the diisocyanate and heated slowly to 90° C. for 1 hour under twenty-nine inches of vacuum and then cooled to room temperature, drawn off and packaged. A typical formula is as follows:

| Part B | |
|---|---|
| Polypropylene glycol (triol) TP-440 | 15.00 |
| Hylene W (diisocyanate) | 85.00 |
| | 100.00 |

The molecular weight of the triol can vary from 400 to 2000 and the Hylene has a large range.

Tetrols can be substituted for triol in either Part A or Part B. Any suitable diol can be used.

The catalyst can be any heavy metal compound of the group of tin, lead, zinc, mercury, bismuth, cadmium, antimony, etc. A suitable antioxidant yielding a colorless compound can be used. Ultra-violet absorbers soluble in polyol and clear in the final product are suitable. The surface active agent is a silicone compound and can be one of many compounds.

Hylene W is an aliphatic diisocyanate available from E. I. duPont de Nemours & Co. Substitutes for it are hexamethylene diisocyanate, xylene diisocyanate, cyclohexyl diisocyanate or any light stable (saturated) diisocyanate.

After Part A and Part B are prepared as stated, the two parts are then mixed in the proper proportion, degassed to remove air bubbles and poured onto an emblem or other surface to form a clear, hard plastic material. The cure can be accelerated by the addition of heat.

The polypropylene glycol (diol) and the polypropylene glycol (triol) are commonly available on the market, and for example, can be those manufactured by the BASF Wyandotte Corporation as P-410 and TP-440, respectively, P-410 is listed by BASF Wyandotte as a "Pluracol" polyether diol having a molecular weight of 425 (calculated from hydroxyl number), an OH No. of 265, a viscosity of 25° C. of 75 cps, and a pH of 6.5. TP-440 is listed by BASF Wyandotte as a polyether triol having a molecular weight of 425 (calculated from hydroxyl number), an OH No. of 398, a viscosity at 25° C. of 600 cps and a pH of 6.5.

The two parts, Part A and Part B, are mixed in the following proportions:

| | |
|---|---|
| Part A | 44.50 |
| Part B | 55.50 |
| | 100.00 |

This is the preferred proportion, although the proportions can vary from 40–50% for Part A and from 60–50% for Part B.

The resulting urethane compound is 100 percent solid and clear and is stable under sunlight and weathering. The preparation of a hard, glass-like, colorless polyurethane by the use of triols and tetrols modified with diols for elasticity is believed novel as is the use of an antioxidant to help stabilize a polyurethane.

To produce the compound and cast it in an emblem, several steps are involved which are enumerated below.

Referring to FIG. 1, there is shown the casting apparatus designated generally as 10. A vacuum line 12 is connected via lines 14 and 16 to storage - degassing tanks 22 and 24, respectively. A pair of ball valves 18 and 20 are inserted in lines 14 and 16 to insure against any air going back into the tanks. Supply lines 30 and 26, having ball valves 32 and 28 therein, supply component Part A and Part B to tanks 22 and 24, respectively. The "A" and "B" materials can be stirred for the purpose of degassing.

The degassed material then flows down pipes 34, 36 through ball valves 38, 40 through filters 42, 44 through metering devices and into mixing and casting head 46 which is of a standard design.

Located beneath the casting head is a moving conveyor 48 with which the casting head 46 is timed. The conveyor carries the ornaments or pieces to be cast[, such as 50]. When a piece comes under the casting head, [the belt stops. A] *a* predetermined amount of the plastic material is cast [and then the conveyor moves the next piece into position]. The cast pieces are moved forward into baking areas. The pieces are then cooled and unloaded.

The cast material has the property of hardness without brittleness and withstands heavy abuse from strong detergents and from impact. It can withstand rigid water and humidity tests, salt and acid tests, hot and cold temperature tests, and gas tests. Thus, it is an excellent filler material for painted decorative parts.

The cured material has a shore "D" hardness of 80–85 and a specific gravity of 1.06. The component part A has a viscosity of 375 cps, although the cps (centipoise) can vary from 300 to 1000, 2 RPM RVP Brookfield #4 spindle at 25° C.; 390 cps (300 to 1000 cps is the range) 20 RPM RVP Brookfield #4 spindle at 25° C. Component Part B's viscosity is 500 cps 2 RPM RVP Brookfield #4 spindle at 25° C., 20 RPM RPV Brookfield #4 spindle at 25° C. Component Part A has a specific gravity of 1.05 and component Part B has a specific gravity of 1.07.

Again the mixing ratio, by weight, is approximately 45 parts of Part A and 55 parts of Part B. The mixing ratio, by volume, is one part of Part A to one part of Part B. The volume tolerance should not vary from plus or minus one-half part. The gel time for the mixed parts is approximately two minutes and ten seconds, although the range is from two to seven minutes at 150° F. If a high crown or bulge on the top of the cast emblem is desired, it can be cured at room temperature up to 200° F. for a longer period.

The decorative part must be free of moisture, grease, dust and other foreign matter. The part must be perfectly level and must be relatively flat. The component parts are mixed carefully and thoroughly in the mixing and casting head. The material should be mixed without entrapping air. If air bubbles do develop, the material should immediately be degassed. This is done by drawing a good vacuum on the material, releasing the vacuum, drawing another vacuum and releasing the vacuum again. The compound should be mixed, degassed and cast within the aforementioned gel time.

The plastic material is clear and, when cast, increases the clarity of the paint on the cast part and enhances the details of the embossed and debossed areas. The surface of the cast material has a slight crown which adds to blending the cast plastic to the part, whether the latter be metal, aluminum or plastic. The material can be tinted with various colors, but excellent results are obtained with the clear cast which contrasts with the decorative metal and paint.

Figure 2:
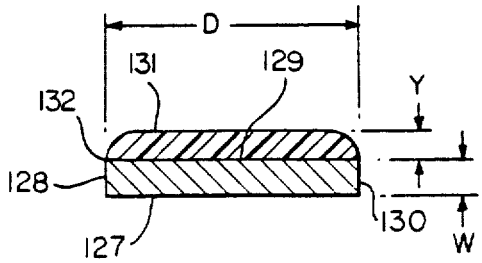
FIG. 2 is a cross-sectional view of a cast atop a planar disc and the dimensional relationships therebetween.

FIG. 2 shows a flat metal disc 127 having perpendicular peripheral sides 128, 130. The material is flat on top and slopes down to form a positive meniscus. D represents the diameter of the disc, Y the height of the material and W the height of the disc. Test results of a disc where [Z] *W* is 0.020 inches are as follows:

| D in Inches | Y in Inches |
|---|---|
| 0.25 | .030 |
| 0.50 | .075 |
| 0.75 | .100 |
| 1.00 | .125 |
| 1.50 | .125 |

In the table, Y represents the maximum height that the material may achieve without flowing over the periphery of the disc. Applications of more liquid on disc 127 than denoted in the Y column results in liquid overflows due to a break in surface tension. Overflow results in thinner film sections. The compound of the instant invention was used at the discs temperature of 72° F.

When a free body of liquid, such as the compound of this invention, is at rest on a solid, the degree of flatness on the top surface of the liquid is a function of the condition at the edges where the liquid contacts the solid. If the wettability characteristics of the liquid are such that liquid does not "wet" the solid, it indicates that the liquid particles attract each other more than the solid particles attract the liquid particles. That is, the cohersive forces of the liquid are greater than the adhesive forces of the solid and liquid. This condition of the liquid is called the "meniscus". The meniscus formed by the instant compound when it is applied to a flat surface results in a lens effect. The lens effect is exploited by applying the compound to a painted or decorated surface to increase the aesthetic values related to depth, clarity and brilliance. These characteristics are used to produce the foil-backed inserts. The meniscus formed by the instant compound [when it contacts the retaining walls of the die cast cavities] results in a lens effect.

Figure 3:
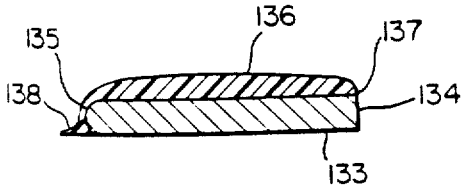
FIG. 3 is a cross-sectional view of a plastic emblem cast atop a disc with rounded edges.

FIG. 3 shows what happens when the condition of the disc edge is not perpendicular. A disc 133 has a perpendicular edge 134 and a rounded edge 135. The material 136 will stay on the disc at 137 adjacent the perpendicular edge 134 and runs over the rounded edge 135 as at 138.

Figure 4:
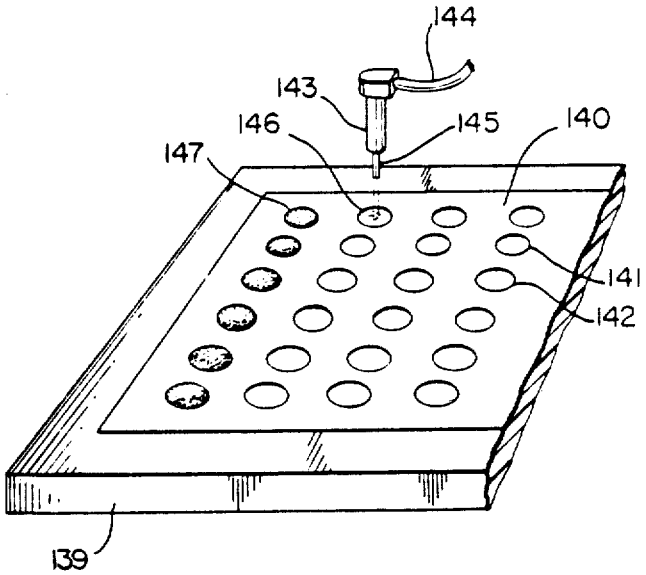
FIG. 4 is a partial perspective view of a casting operation.

FIG. 4 shows a sample casting operation wherein a vacuum chuck 139 holds a sheet of release paper 140 thereon through a vacuum being created underneath the sheet. Chuck 139 has a plurality of holes therein (not shown) through which the vacuum is applied. A series of metallic film discs 141, 142, etc. are placed on the sheet. The discs have been lithographed or silk screened on their top surface and have an adhesive on the bottom thereof. The operator or automatic machine utilizes dispensing head 143 with nozzle 145 and supply line 144 to dispense the composition atop and onto each disc. The dispensing head 143 regulates the amount. The discs are similar to the disc 130 of FIG. 2 insofar as it has a sharply defined peripheral side and intersections with the top planar surface. The cast composition is cured and cooled and the ornamental design on the top of the disc is enhanced by the "lens effect" created by the cast composition.

It is important to keep the material that forms the insert or base flat or horizontal during the casting and during process. The base can be a foil of metal, paper or Mylar. If a metal foil, the design is embossed therein prior to casting. In the technique shown in FIG. 4, the discs are spaced to avoid any static charge attraction between the discs as the material is cast thereupon.

A new improved composition and unique casting technique have resulted in new improved products. Because of the surface tension of the composition, the employment thereof in ornaments creates a "lens effect", thereby enhancing the aesthetic effect of the ornament.

While only one embodiment of the invention has been shown and described, it will be obvious to those of ordinary skill in the art that many changes and modifications can be implemented without departing from the scope of the appended claims.

What is claimed is:

1. A method of forming *a plurality of* foil-backed inserts in the form of cast decorative emblems, comprising:

a. [providing a series] *releasably maintaining an arrangement of a plurality* of flat decorative foil shapes *on a support sheet such that the plurality of shapes is on the sheet at the same time,* onto which *shapes* a clear, hard plastic composition suitable as a substitute for vitreous enamel is to be cast,
*each of* said foil shapes [each] having a top and bottom surface,
*each of* said foil shapes also having sharply defined peripheral sides which intersect with said top surface, and
*each of said foil shapes* having an adhesive coated on said bottom surface, b. holding said [series] *arrangement* of foil shapes *in a manner in which each shape is maintained* flat and horizontal on a [supported] *supporting* surface free from surrounding side walls *by temporarily securing said support sheet to the supporting surface,* c. casting a measured amount of said plastic composition in liquid form, which liquid is poorly wetting with respect to the top surface of said foil shapes, directly onto the top surface of each of said foil shapes *in a casting sequence with respect to the arrangement in which each foil shape receives a measured amount of said plastic* so that it flows to said sharply defined peripheral sides *of the shapes* and forms a positive meniscus without flowing over said sharply defined peripheral sides, d. allowing said cast plastic composition to cure while maintaining *said support sheet for the arrangement of* said foil shapes flat and horizontal, whereby said cured plastic composition gives a lens effect to the top surface *of each* of said foil shapes onto which it has been cast, [and]

e. *removing said support sheet from the supporting surface and said shapes from said sheet,*

*f.* utilizing said adhesive coated bottom surface of said foil shapes to adhere said inserts [onto] *at* their intended [base] *decorative location.*

2. The method of claim 1 wherein said decorative foil shapes are discs formed of a metal foil having an ornamental design embossed thereon.

3. The method of claim 2 wherein said discs have a diameter of from 0.25–1.50 inches and said plastic composition is cast to a height of from 0.03 to 0.125 inches on each of said discs.

4. The method of claim 3 wherein said discs are approximately one inch in diameter and said plastic composition is cast to a height of no more than 0.125 inches.

5. The method of claim 1 wherein said plastic composition is a polyurethane having a polyether polyol component and a diisocyanate component.

6. The method of claim 5 wherein said polyether polyol component of said polyurethane composition comprises a polyether diol, a polyether triol, a catalyst, an antioxidant, and ultra-violet absorber, and a small amout of surface active agent.

7. The method of claim 6 wherein said diisocyanate component of said polyurethane composition comprises an aliphatic diisocyanate and a polyether triol.

8. The method of claim 7 wherein said polyether polyol component consists of approximately 19% polypropylene diol, 78% polypropylene triol, 1% catalyst, 1% antioxidant, 1% ultra-violet absorber and 0.04% surface active agent.

9. The method of claim 8 wherein said diisocyanate component consists of approximately 85% aliphatic diisocyanate and 15% polypropylene triol.

10. The method of claim 9 wherein said polyurethane composition comprises 40–50 percent of said polyether polyol component and 60–50 percent of said diisocyanate component.

*11. The method of claim 1: (i) wherein in the step of releaseably maintaining, said arrangement of foil shapes with the adhesive on the bottoms of the foil shapes, is placed on a release liner sheet and (ii) wherein in the step of holding, said liner sheet is held flat and horizontal by holding said release liner sheet on a support surface through creating a vacuum underneath said release liner sheet.*

*12. The method of claim 1 wherein said foil shapes are spaced such as to avoid any static charge attraction between the foil shapes as the material is cast thereupon.*

*13. A casting operation for producing a plurality of foil backed inserts having an enhanced ornamental design on the top of a surface thereof, comprising:*

*a. providing each of a plurality of individual, flat decorative foil shapes with:*

*(i) a top and bottom surface,*

*(ii) an ornamental design on the top surface,*

*(iii) a sharply defined peripheral side having intersections with the top surface free from side walls, and*

*(iv) an adhesive on the bottom surface; onto which shapes a polyurethane casting composition suitable as a substitute for a vitreous enamel decoration is to be cast;*

*b. arranging the plurality of individual shapes on a releasable support surface for presention of the support surface with the arranged shapes thereon to a casting station;*

*c. and in the step of arranging said shapes:*

*(i) maintaining each shape flat and horizontal on the support surface free from said side walls, and*

*(ii) spacing the shapes apart from each other such as to avoid substantial static charge between said shapes during the step of casting;*

*d. presenting the support surface having the plurality of arranged shapes thereon to a casting station;*

*e. casting a polyurethane composition in a liquid form which is poorly wetting with respect to the top surface of said shapes directly onto the top surface of each of said shapes in a manner with respect to the plurality of arranged shapes in which*

*(i) a regulated amount of said polyurethane sufficient to form a positive meniscus is dispensed onto the top of each shape, and*

*(ii) said polyurethane flows to said sharply defined peripheral sides and forms a positive meniscus on the top of said shape without flowing over said sides; and*

*f. maintaining the shapes flat and horizontal during the dispensing of the polyurethane and during the curing of the polyurethane, whereby, upon curing, the cast polyurethane composition enhances the ornamental design on the top of the shapes by providing a lens effect with respect to the design thereon.*

*14. The method of claim 13 in which the decorative foil shape is a metallic film shape and in which*

*(a) in the step of providing an ornamental design the top surface thereof, the design is provided by at least one of embossing and silk screening or lithographing; and*

*(b) in the step of arranging, said shapes are arranged on a sheet of release paper such that the plurality of shapes is present on the paper at the same time and said release paper having the arranged shapes thereon is held by a vacuum chuck which comprises the support surface.*

* * * * *